United States Patent
Ikeda et al.

(10) Patent No.: US 7,978,807 B2
(45) Date of Patent: Jul. 12, 2011

(54) NUCLEAR REACTOR

(75) Inventors: Kazumi Ikeda, Tokyo (JP); Taro Kan, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 551 days.

(21) Appl. No.: 11/965,378

(22) Filed: Dec. 27, 2007

(65) Prior Publication Data

US 2011/0142190 A1 Jun. 16, 2011

(30) Foreign Application Priority Data

Aug. 1, 2007 (JP) ................................. 2007-200419

(51) Int. Cl.
*G21C 15/00* (2006.01)
(52) U.S. Cl. ........................................ 376/381; 376/382
(58) Field of Classification Search .................. 376/381, 376/382, 458, 347
See application file for complete search history.

(56) References Cited

U.S. PATENT DOCUMENTS

| 3,366,549 | A | * | 1/1968 | Trickett et al. | 376/383 |
| 4,543,232 | A | * | 9/1985 | Elter et al. | 376/289 |
| 5,032,349 | A | * | 7/1991 | Brandes et al. | 376/338 |
| 2005/0220251 | A1 | * | 10/2005 | Yokoyama et al. | 376/220 |
| 2006/0210011 | A1 | * | 9/2006 | Karam | 376/347 |

FOREIGN PATENT DOCUMENTS

JP    2003-222693 A    8/2003

* cited by examiner

*Primary Examiner* — Rick Palabrica
(74) *Attorney, Agent, or Firm* — Westerman, Hattori, Daniels & Adrian, LLP

(57) ABSTRACT

A nuclear reactor includes a reflector and a flow path. The reflector reflects neutrons, contains graphite and a moderator having a smaller moderating power than the graphite, and is sectioned into plural parts along a direction of flow of fuel pebbles. The flow path is surrounded by the reflector, and the fuel pebbles flow through the flow path and undergo nuclear reaction to generate power. Volume ratio of the graphite to the moderator having a smaller moderating power than the graphite in each part of the reflector is determined based on a power distribution in the reactor core in the direction of flow of the fuel pebbles.

2 Claims, 18 Drawing Sheets

FIG.6

[RATIO IN VOLUME]

| | | CONVEN-TIONAL EXAMPLE | EXAMPLE 1 | EXAMPLE 2 | EXAMPLE 3 | EXAMPLE 4 |
|---|---|---|---|---|---|---|
| INNER REFLECTOR | UPPER PART (%) | C: 100 | SiC: 25 C: 75 | SiC: 50 C: 50 | SiC: 75 C: 25 | SiC: 100 |
| | CENTRAL PART (%) | C: 100 | SiC: 25 C: 75 | SiC: 50 C: 50 | SiC: 75 C: 25 | SiC: 100 |
| | LOWER PART (%) | C: 100 | C: 100 | C: 100 | C: 100 | C: 100 |
| OUTER REFLECTOR (%) | | C: 100 | C: 100 | C: 100 | C: 100 | C: 100 |

FIG.8

[RATIO IN VOLUME]

| | | CONVEN-TIONAL EXAMPLE | EXAMPLE 5 | EXAMPLE 6 | EXAMPLE 7 | EXAMPLE 8 |
|---|---|---|---|---|---|---|
| INNER REFLECTOR | UPPER PART (%) | C: 100 | SiC: 75 C: 25 | SiC: 100 | SiC: 75 C: 25 | SiC: 75 C: 25 |
| | CENTRAL PART (%) | C: 100 | C: 100 | C: 100 | SiC: 25 C: 75 | SiC: 25 C: 75 |
| | LOWER PART (%) | C: 100 | C: 100 | C: 100 | C: 100 | C: 100 |
| OUTER REFLECTOR | UPPER PART (%) | C: 100 | SiC: 75 C: 25 | SiC: 75 C: 25 | SiC: 75 C: 25 | SiC: 75 C: 25 |
| | CENTRAL PART (%) | C: 100 | C: 100 | C: 100 | C: 100 | C: 100 |
| | LOWER PART (%) | C: 100 | C: 100 | C: 100 | C: 100 | C: 100 |
| NOTE | | | | | | ADJUSTMENT OF URANIUM ENRICHMENT |

FIG.11
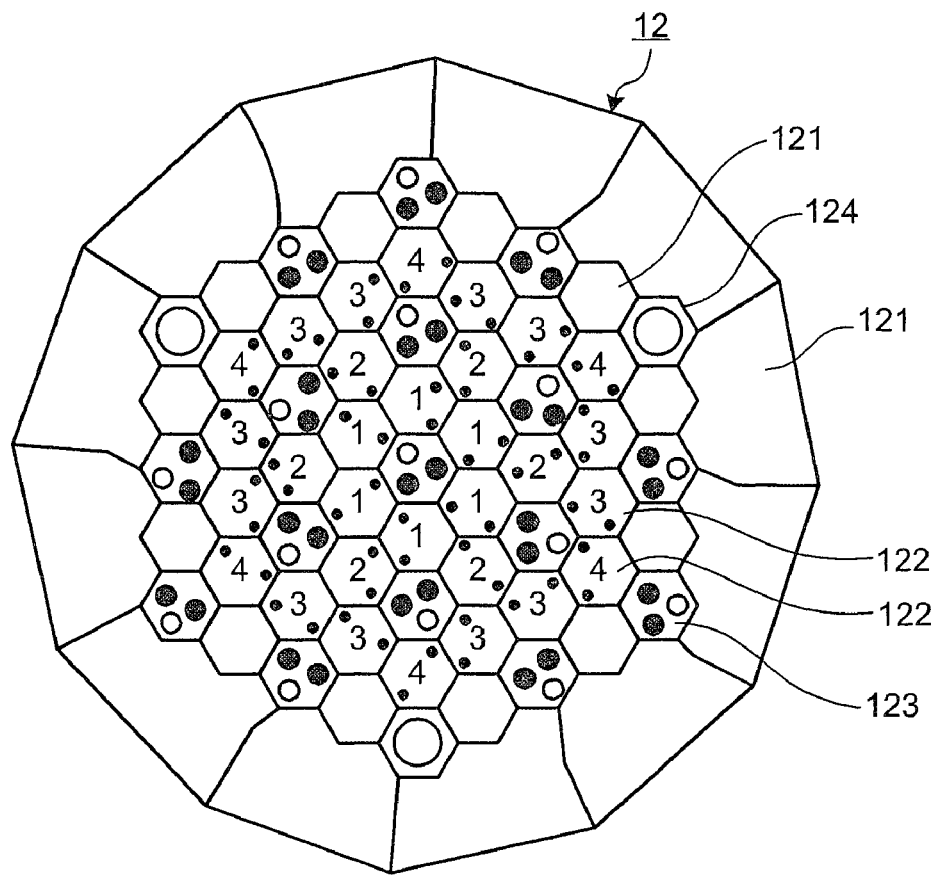
 : FUEL COLUMN
  N: REGION NUMBER
  •: REACTIVITY CONTROLLER
 : CONTROL ROD GUIDE COLUMN
  ○: CONTROL ROD
  •: BACKUP SHUTDOWN SYSTEM
 : IRRADIATION TEST COLUMN
 : GRAPHITE REFLECTOR COLUMN

SECTION ALONG
A-A

CONVENTIONAL EXAMPLE

*$^{235}$U/U

EXAMPLE 11

\* SiC/SiC+C
\*\* $^{235}$U/U

NUCLEAR REACTOR

BACKGROUND OF THE INVENTION

1. Field of the Invention

The present invention relates to a nuclear reactor, and more particularly to a nuclear reactor that allows for equalization and/or optimization of power distribution in a reactor core.

2. Description of the Related Art

Pebble bed reactors (PBR) have a flow path (fuel region) that is surrounded by a reflector(s). Sphere-shaped fuel bodies (fuel pebbles) containing nuclear fuel material undergo nuclear reaction inside the flow path thereby producing power. In view of safety, it is preferable for the nuclear reactors in general to have equalized power distribution in a reactor core. In the PBR, the fuel body goes down the flow path and is repeatedly removed and reloaded, whereby the power distribution in the nuclear reactor is equalized in an axial direction (i.e., direction in which the fuel bodies flow in the flow path). Hence, while the nuclear reactor is running, replacement (removal and reloading) of the fuel bodies is continuously performed, i.e., removed fuel bodies are inspected, and new fuel bodies are loaded.

For example, a 170,000 kilowatts (kW) class nuclear reactor uses 415,000 fuel bodies, among which 6,000 are removed from the nuclear reactor for inspection every day. Among the removed 6,000 fuel bodies, approximately 600 are replaced with new ones. New fuel bodies are loaded into the nuclear reactor together with the approximately 5,400 remaining fuel bodies. Generally, average life of the fuel body is about two years, and one fuel body is reloaded nine times on average during its life.

However, if the replacement of the fuel bodies becomes more frequent, operational costs (costs for inspection and replenishment of the fuel bodies) increase accordingly, which in turn results in an increased cost for power generation. Hence, it is preferable to equalize the power distribution in the nuclear reactor without increasing the frequency of fuel replacement.

One conventional technique applicable to the pebble bed reactor is known from Japanese Patent Application Laid-Open No. 2003-222693. The conventional reactor (nuclear reactor facility) described therein includes a detecting unit that receives plural fuel spheres discharged from a reactor core and detects burnup of the fuel spheres, and a sorting unit that determines a radial loading position from which the fuel sphere is reloaded into the reactor core according to the result of detection by the detecting unit.

In a block reactor, a fuel body having a hexagonal columnar shape houses fuel compacts. Base material of the fuel compact is graphite. The fuel compact is filled with coated fuel particles (of approximately 1-mm diameter). Nuclear fuel material contained in the fuel particle undergoes nuclear reaction thereby producing power. For the equalization or the optimization of the power distribution in an axial direction, enriched uranium is prepared in twelve different levels of enrichment, for example. Preparation or manufacture of enriched uranium at various levels of enrichment in a large amount pushes up the manufacturing cost of the fuel.

SUMMARY OF THE INVENTION

It is an object of the present invention to at least partially solve the problems in the conventional technology. Specifically, one object of the present invention is to provide a nuclear reactor which allows for equalization and/or optimization of power distribution in a reactor core.

In order to achieve an object as described above, a nuclear reactor (pebble bed reactor) according to one aspect of the present invention includes a reflector reflecting neutrons and containing graphite and moderator having a smaller moderating power than the graphite, the reflector being sectioned into plural parts along a direction of flow of fuel pebbles, and a flow path surrounded by the reflector, and through the flow path the fuel pebbles (fuel bodies) flow and undergo nuclear reaction to generate power. A volume ratio of the graphite to the moderator having a smaller moderating power than the graphite in each part of the reflector is determined based on a power distribution of a reactor core in the direction of flow of the fuel pebbles.

Further, in the nuclear reactor (pebble bed reactor) according to another aspect of the present invention, when a power density obtained with the reflector consisting of graphite is taken as a reference, a part of the reflector located at a position with a higher power density contains a higher volume fraction of the moderator having a smaller moderating power than the graphite than a part of the reflector located at a position with a lower power density.

Still further, in the nuclear reactor (pebble bed reactor) according to still another aspect of the present invention, the reflector contains a higher volume fraction of the moderator having a smaller moderating power than the graphite in a portion located at an upstream side of the flow path of the fuel pebbles than in a portion located at a downstream side of the flow path of the fuel pebbles.

Still further, in the nuclear reactor (pebble bed reactor) according to still another aspect of the present invention, the reflector includes an inner reflector and an outer reflector that surrounds a reactor core, the flow path of the fuel pebbles is surrounded by an outer circumference of the inner reflector and an inner circumference of the outer reflector, and a volume fraction of the moderator having a smaller moderating power than the graphite is set equal to or higher than 25% in at least an approximately ⅓ portion of the inner reflector from the upstream side of the flow path of the fuel pebbles.

Still further, in the nuclear reactor (pebble bed reactor) according to still another aspect of the present invention, the volume fraction of the moderator having a smaller moderating power than the graphite is set equal to or higher than 25% in an approximately ⅔ portion of the inner reflector from the upstream side of the flow path of the fuel pebbles.

Still further, in the nuclear reactor (pebble bed reactor) according to still another aspect of the present invention, the reflector includes an inner reflector and an outer reflector that surrounds a reactor core, the flow path of the fuel pebbles is surrounded by an outer circumference of the inner reflector and an inner circumference of the outer reflector, and the volume fraction of the moderator having a smaller moderating power than the graphite is set equal to or higher than 75% in at least an approximately ⅓ portion of each of the inner reflector and the outer reflector from the upstream side of the flow path of the fuel pebbles.

Still further, in the nuclear reactor (pebble bed reactor) according to still another aspect of the present invention, the reflector includes an inner reflector and an outer reflector that surrounds a reactor core, the flow path of the fuel pebbles is surrounded by an outer circumference of the inner reflector and an inner circumference of the outer reflector, and the volume fraction of the moderator having a smaller moderating power than the graphite is set equal to or higher than 75% in an approximately ⅓ portion of the inner reflector from the upstream side of the flow path of the fuel pebbles, equal to or higher than 25% in an approximately ⅓ portion at the center of the inner reflector, and equal to or higher than 25% in an approximately ⅓ portion of the outer reflector from the upstream side.

Still further, in the nuclear reactor (pebble bed reactor) according to still another aspect of the present invention, criticality of the reactor core is adjusted by enrichment of the fuel pebbles.

Still further, a nuclear reactor (block reactor) according to still another aspect of the present invention includes a reactor core, a fuel block arranged in the reactor core, the fuel block having a coolant flow path through which a coolant flows to cool the fuel block, and a reflector arranged inside the reactor core and sectioned into plural parts along a flow direction of the coolant, the reflector containing graphite and a moderator having a smaller moderating power than the graphite, and a volume ratio of the graphite to the moderator having a smaller moderating power than the graphite in each part of the reflector is determined based on a power distribution in the reactor core in the flow direction of the coolant.

Still further, in the nuclear reactor (block reactor) according to still another aspect of the present invention, a volume fraction of the moderator having a smaller moderating power than the graphite in each part of the reflector is determined so that the volume fraction increases from an upstream side to a downstream side of the coolant flow path.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a table of a first set of specific examples of composition of reflectors in the nuclear reactor of FIG. 1;

FIG. 8 is a table of a second set of specific examples of composition of reflectors in the nuclear reactor of FIG. 1;

FIG. 11 is a schematic diagram of a reactor core of the nuclear reactor shown in FIG. 10;

DETAILED DESCRIPTION OF THE PREFERRED EMBODIMENTS

The present invention will be described in detail below with reference to the accompanying drawings. It should be noted that the present invention is not limited by embodiments described below. Elements included in the embodiments may be replaceable with or substantially equivalent to alternative elements easily conceived by those skilled in the art. Further, it should be obvious to those skilled in the art that modifications described in relation to the embodiments below may optionally be combined with each other without departing from the scope of the present invention.

First Embodiment

Figure 1:
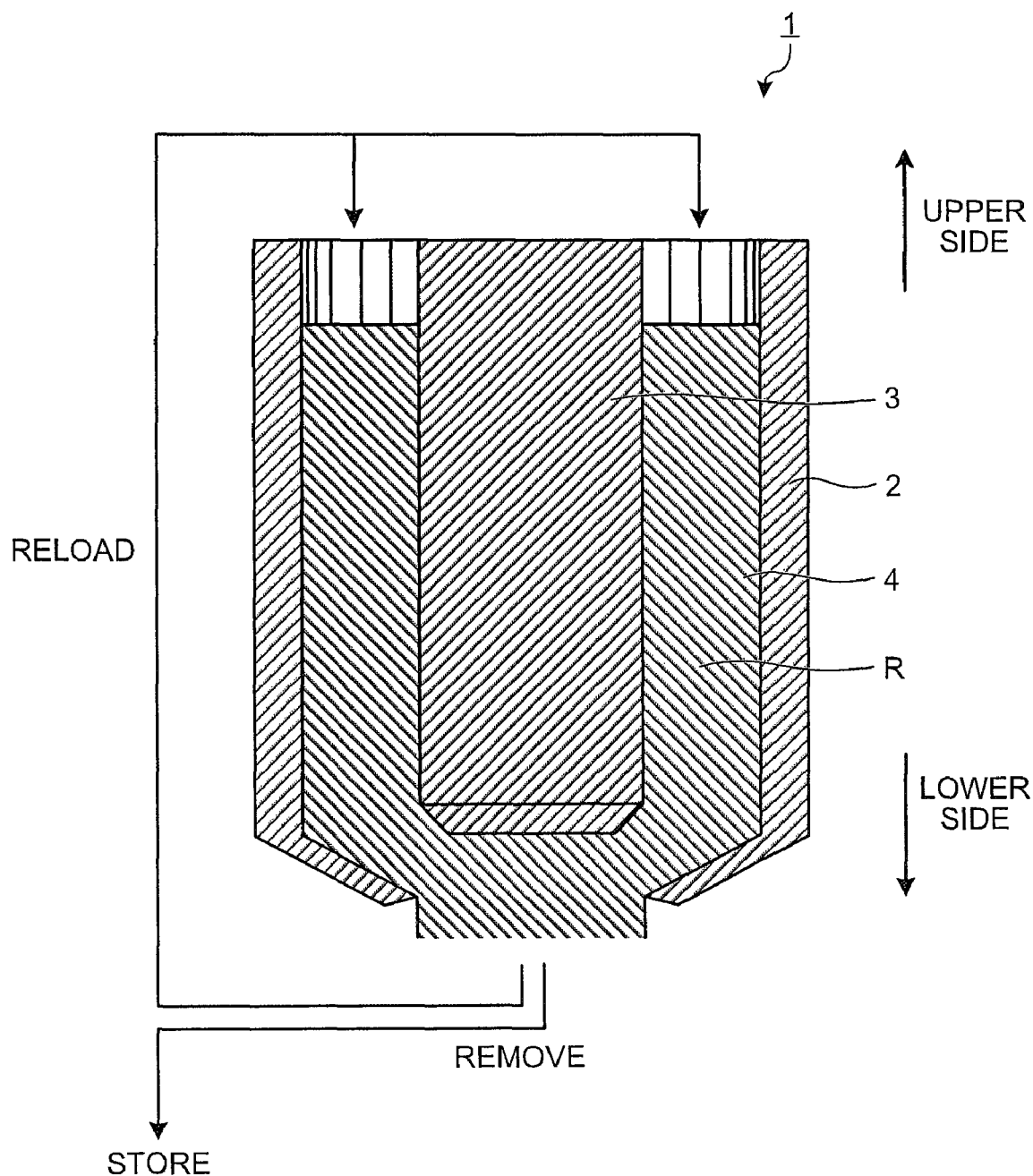
FIG. 1 is a schematic diagram of a nuclear reactor according to the first embodiment of the present invention.

FIG. 1 is a schematic diagram of a nuclear reactor according to the first embodiment of the present invention.

Figure 2:
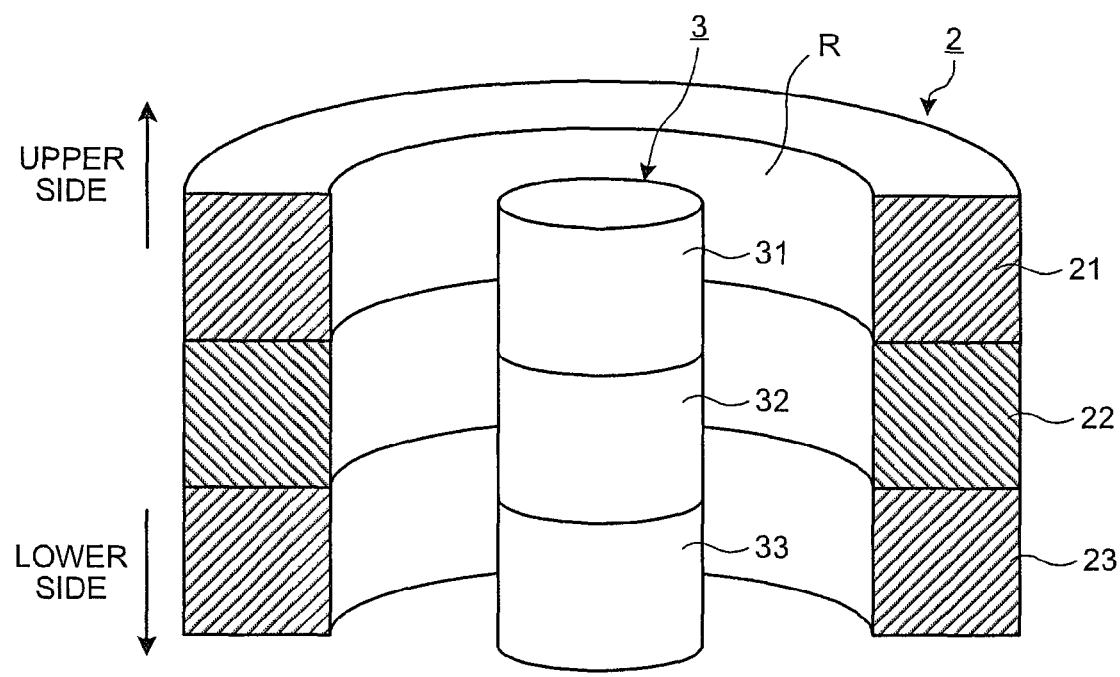
FIG. 2 is a schematic view of an outer reflector and an inner reflector of the nuclear reactor shown in FIG. 1.

FIG. 2 is a schematic view of an outer reflector and an inner reflector of the nuclear reactor shown in FIG. 1.

Figure 3:
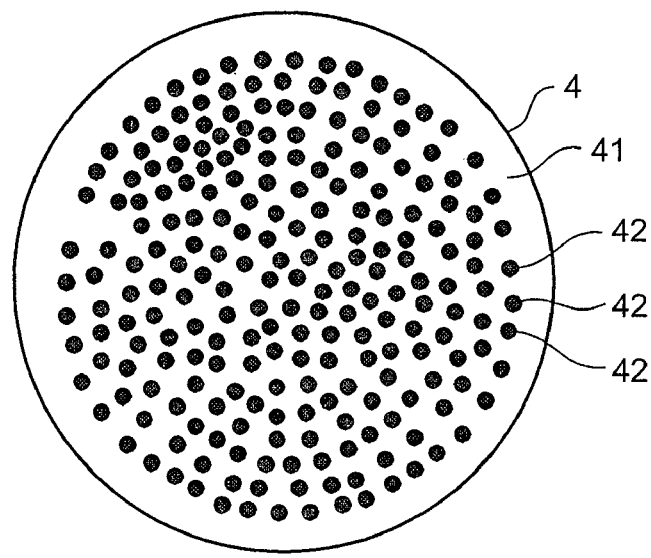
FIG. 3 is a schematic diagram of fuel pebble employed in the nuclear reactor of FIG. 1.
Figure 4:
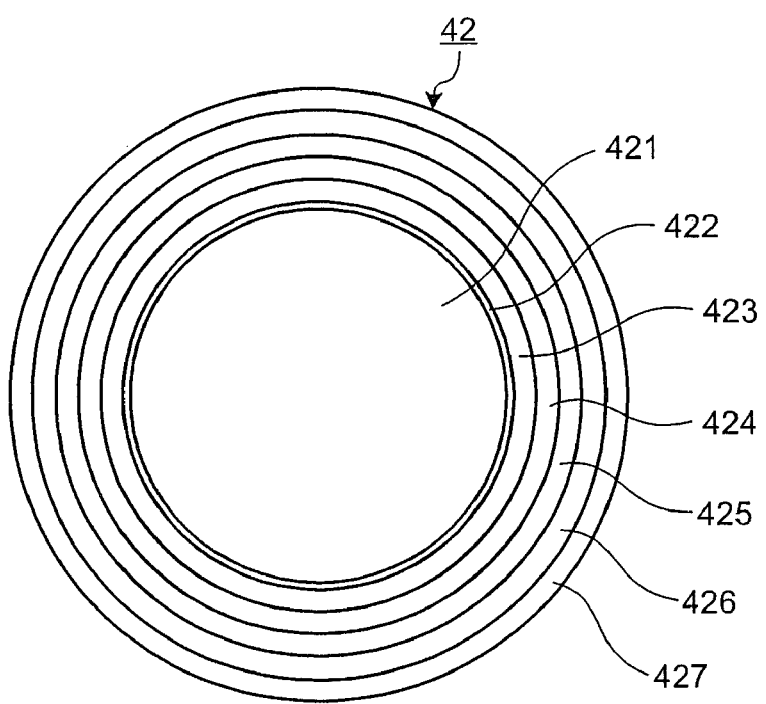
FIG. 4 is a schematic diagram of a coated fuel particle employed in the nuclear reactor of FIG. 1.
Figure 5:
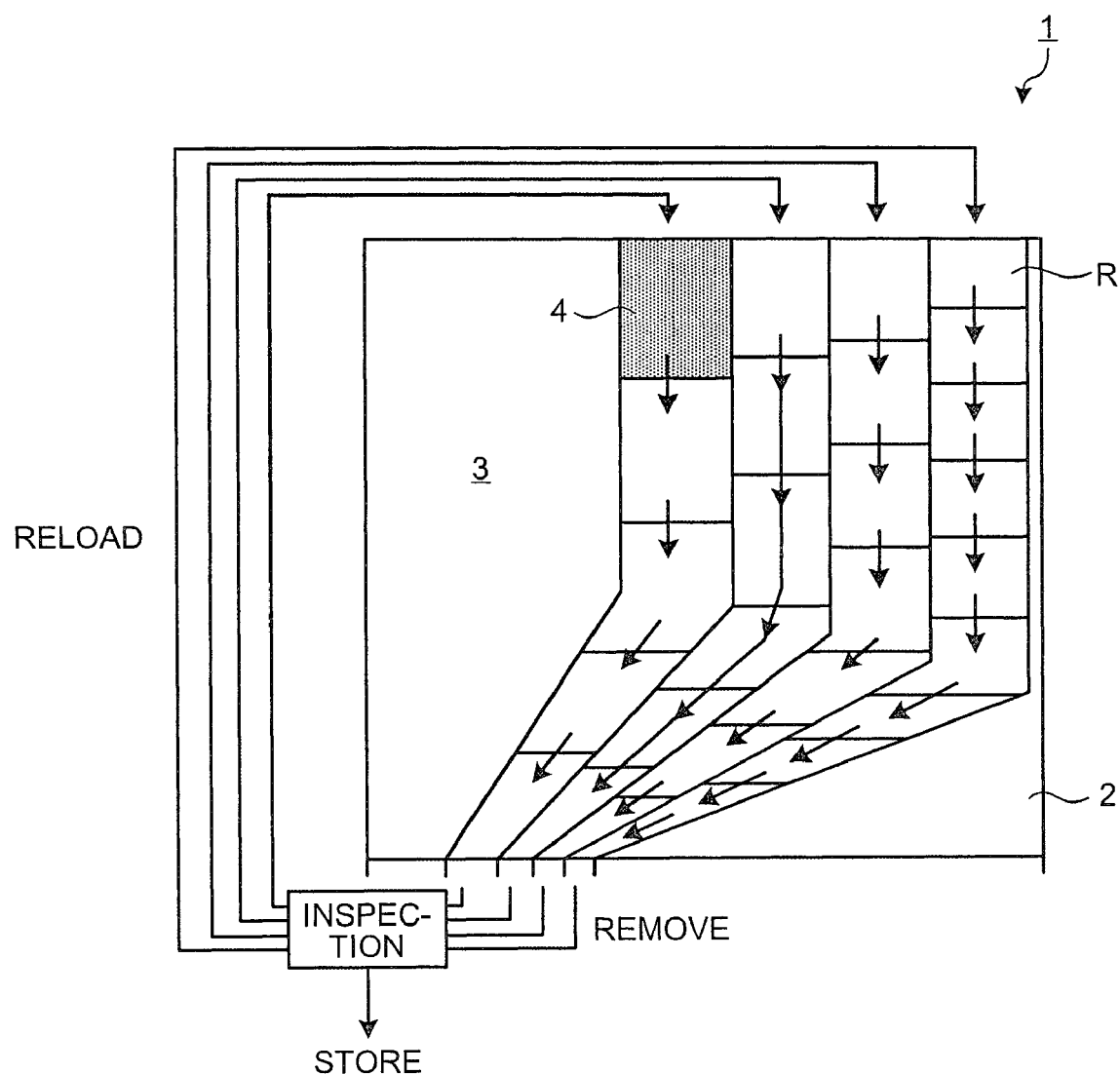
FIG. 5 is a schematic diagram illustrating a general operation of the nuclear reactor shown in FIG. 1.
Figure 7:
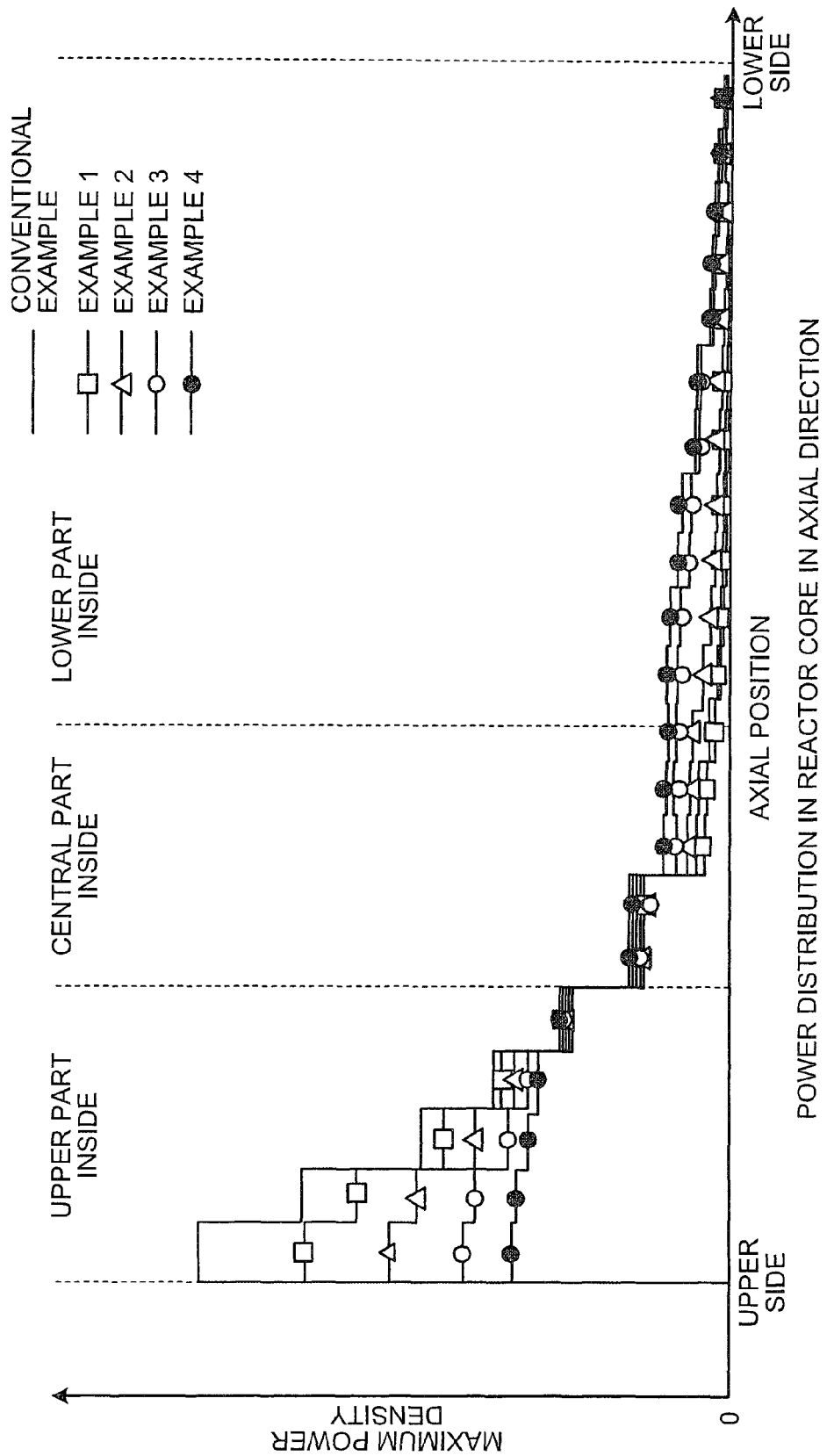
FIG. 7 is a graph illustrating axial power distribution in examples of the nuclear reactor shown in FIG. 6.
Figure 9:
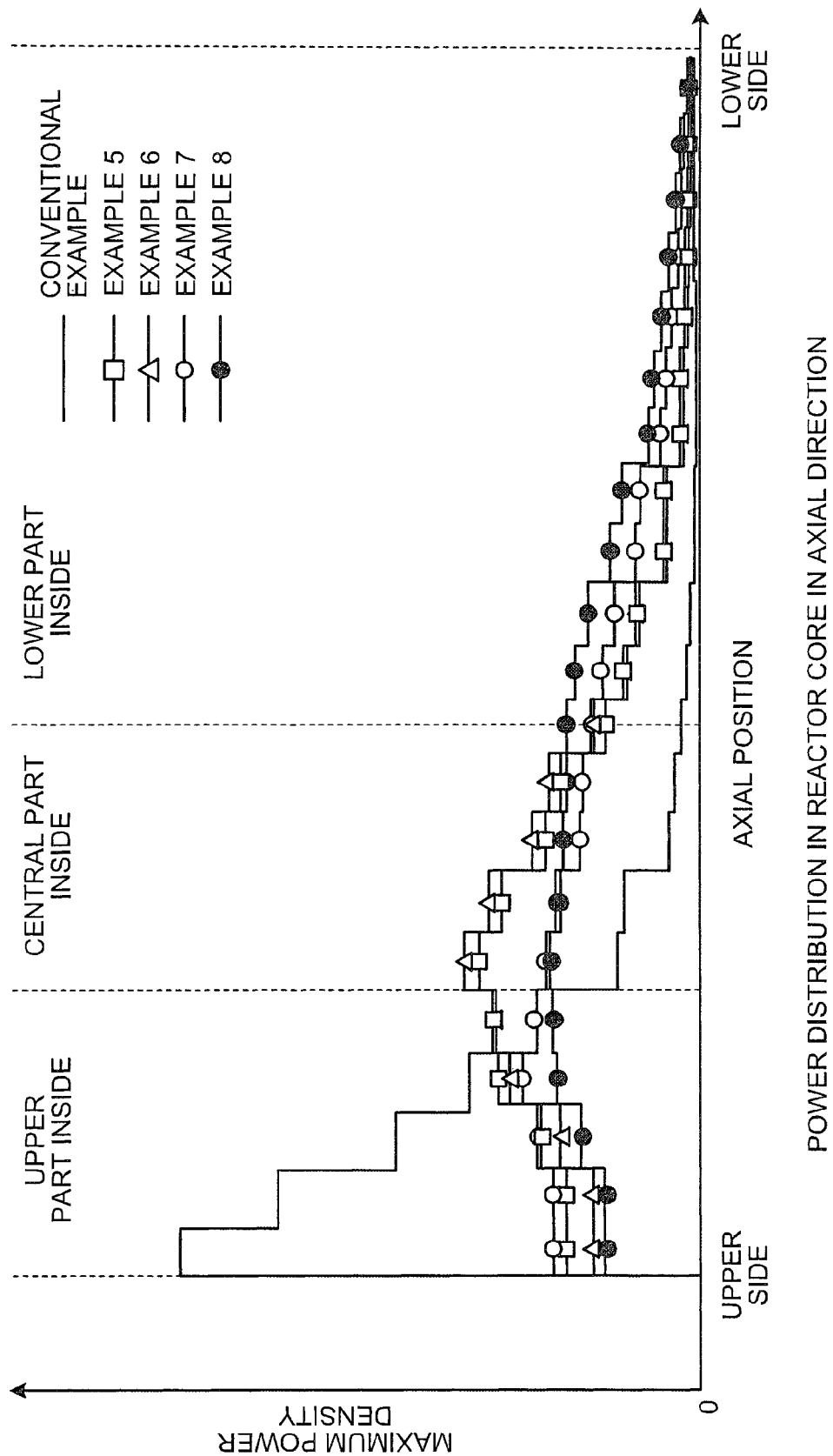
FIG. 9 is a graph illustrating power distribution in examples of the nuclear reactor shown in FIG. 8.
Figure 18:
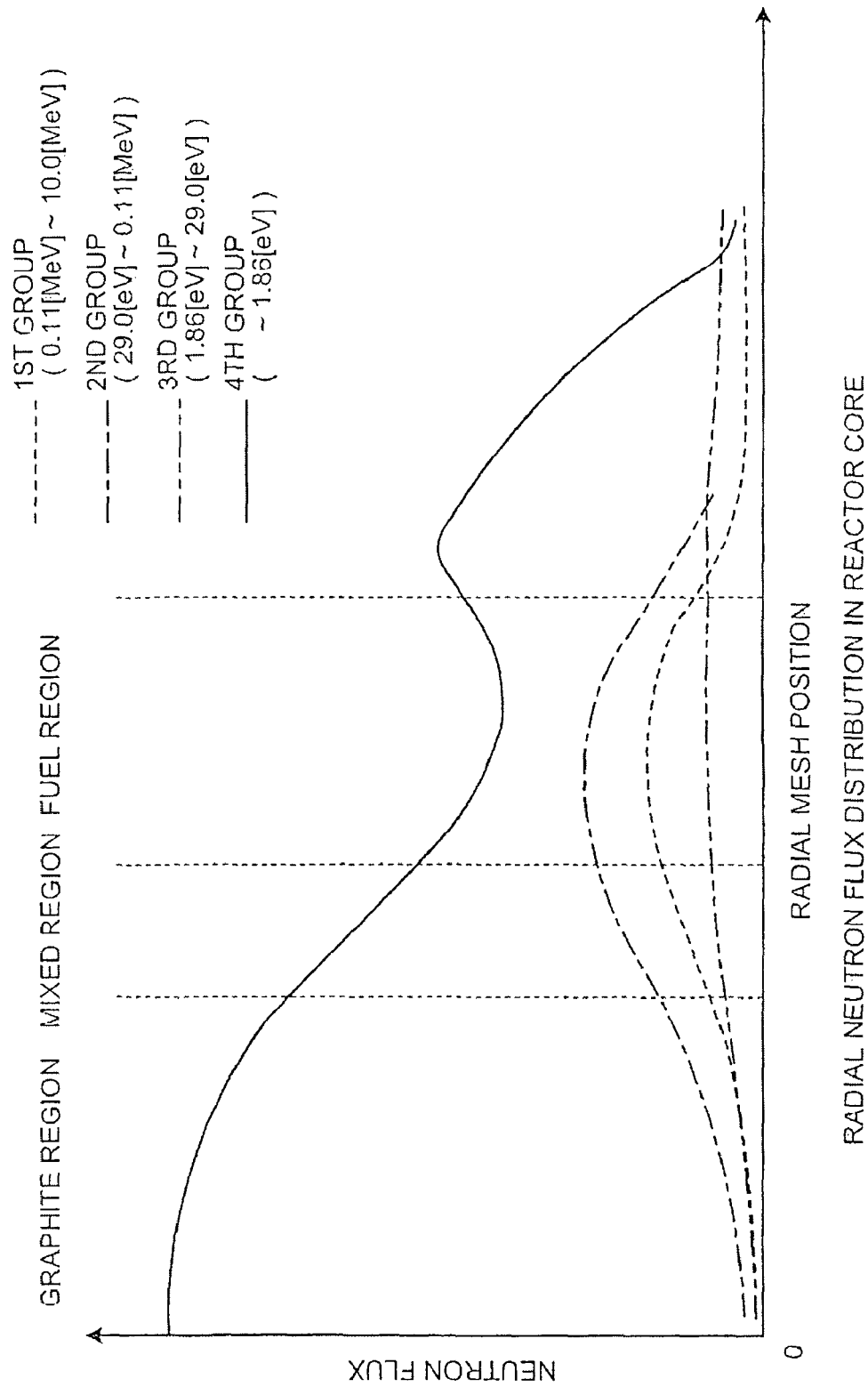
FIG. 18 is a graph of neutron flux distribution in a radial direction in the conventional (pebble bed) nuclear reactor.
Figure 19:
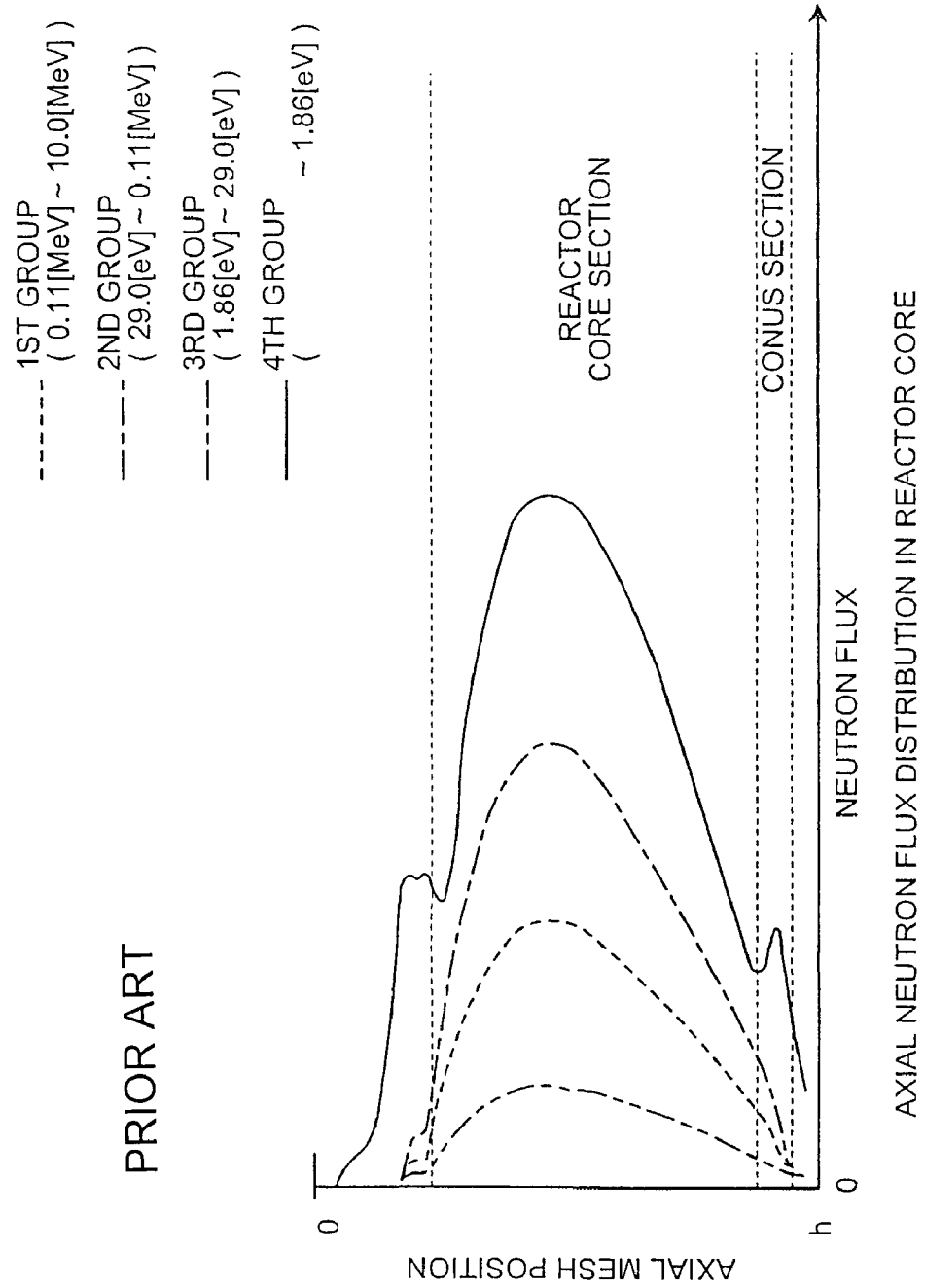
FIG. 19 is a graph of neutron flux distribution in an axial direction in the conventional (pebble bed) nuclear reactor.

FIG. 3 is a schematic diagram of a fuel pebble and FIG. 4 is a schematic diagram of a coated fuel particle. FIG. 5 is a schematic diagram illustrating how the fuel bodies move within the nuclear reactor shown in FIG. 1 for fuel replacement. FIG. 6 is a table showing a first set of specific examples of composition of the reflectors of the nuclear reactor shown in FIG. 1. FIG. 7 is a graph showing power distribution in the examples of the nuclear reactor shown in FIG. 6. FIG. 8 is a table showing a second set of specific examples of composition of the reflectors of the nuclear reactor shown in FIG. 1. FIG. 9 is a graph showing power distribution in the examples of the nuclear reactor shown in FIG. 8. FIGS. 18 and 19 are graphs of neutron flux distribution in a conventional nuclear reactor.

Pebble Bed Reactor

A nuclear reactor 1 is applied, for example, to a pebble bed reactor (see FIG. 1). The nuclear reactor 1 includes an outer reflector 2 and an inner reflector 3. The reflectors 2 and 3 surround a flow path (fuel region) R. The nuclear reactor 1 induces nuclear reaction (nuclear fission or capture, for example) of nuclear fuel materials contained in fuel pebbles (fuel bodies) 4 in the flow path R, thereby generating power. In the nuclear reactor 1, since the fuel pebbles 4 circulate within the flow path R, the power distribution is equalized in an axial direction of a reactor core (direction of flow of the fuel pebbles 4). While the nuclear reactor 1 is running, the fuel pebbles 4 are continuously replaced (removed and reloaded), and accordingly an inspection of the removed fuel pebbles 4 and reloading of new fuel pebbles 4 are performed. In the nuclear reactor 1, helium gas is employed as a coolant.

The outer reflector 2 is a cylindrical member of graphite (C) and silicon carbide (SiC), and constitutes an outer wall of the reactor core (see FIGS. 1 and 2). The outer reflector 2 has a function of reflecting and shielding neutrons emitted from the fuel pebbles 4 at an outer circumference of the reactor core. The inner reflector 3 is a column-like member of graphite (C) (and silicon carbide (SiC)), and is arranged on a central axis of the outer reflector 2. The inner reflector 3 has a function of reflecting the neutrons emitted from the fuel pebbles 4 at a center of the reactor core. The inner reflector 3 also functions as a moderator to moderate the neutrons. The flow path R of the fuel pebbles 4 is between the outer reflector 2 and the inner reflector 3. The flow path R is formed of gaps between the spherical fuel pebbles, and extends in the axial direction of the reactor core.

The fuel body (fuel pebble) 4 includes a graphite shell 41 and plural coated fuel particles 42 embedded in the graphite shell 41 (see FIG. 3). The graphite shell 41 is a sphere of approximately 3 centimeters (cm) in radius. The coated fuel particle 42 is a fuel particle of approximately 0.46 millimeter (mm) in radius. Plural coated fuel particles 42 are dispersed in a central portion (a portion within a range of approximately 2.5 cm in radius) of the graphite shell 41. One graphite shell 41 contains many coated fuel particles 42. The coated fuel particle 42 includes a fuel kernel 421 of approximately 0.25 mm in radius, a gap 422, a low-density pyrolytic carbon (PyC) buffer layer 423, a sealing layer 424, a high-density pyrolytic carbon (PyC) inner layer 425 of approximately 0.040 mm in thickness in radial direction, a silicon carbide layer 426 of approximately 0.035 mm in thickness in radial direction, and a high-density pyrolytic carbon (PyC) outer layer 427 of approximately 0.040 mm in thickness in radial direction (see FIG. 4). The gap 422, the low-density pyrolytic carbon (PyC) buffer layer 423, and the sealing layer 424 together form a layer of approximately 0.095 mm in thickness in radial direction. The coated fuel particle 42 has the fuel kernel 421 as a core and the layers 421 to 426 stacked in the above mentioned order thereon. The fuel kernel 421 is uranium-235 ($^{235}$U) enriched to approximately 8 wt %.

While the nuclear reactor 1 is running, the fuel pebbles 4 are continuously loaded to the reactor core from an upper side of the nuclear reactor 1 (see FIG. 5). Then, the fuel pebbles 4, while flowing through the flow path R inside the reactor core, undergo nuclear reaction, thereby generating thermal energy. After passing through the flow path R, the fuel pebbles 4 are removed from the nuclear reactor 1 from a lower side thereof. Then, a predetermined inspection is carried out on the removed fuel pebbles 4 to check burnup, condition, or the like. If reloadable, the fuel pebble 4 is reloaded to the reactor core from the upper side of the nuclear reactor 1. If the burnup has exceeded a predetermined level (for example 80 GWd/t), or if the condition is not good, the fuel pebble 4 is taken away and stored. FIG. 5 shows batches of the fuel pebbles 4 (assembly of fuel pebbles) move from the upper side to the lower side of the nuclear reactor 1 along zones inside the flow path R. Each of arrows in FIG. 5 indicates a travel distance of the fuel pebbles 4 per unit time.

Composition of Reflector

Generally, it is preferable for safety, for example, to equalize the power distribution (depended on distribution of neutron flux) in a radial direction and in an axial direction inside the reactor core of the pebble bed reactor. For example, if the nuclear reactor employs a reflector consisting of graphite, a peak of power density appears in the neighborhood of a graphite region due to neutron flux distribution in the radial direction in the reactor core as shown in FIG. 18. If the distribution of neutron flux is taken along the axial direction of the reactor core (flow direction of the fuel pebbles 4), the peak appears at a center of the reactor core (see FIG. 19). The peaks appear as described above because uranium-235 contained in the fuel pebble 4 tends to undergo fission reaction more actively on colliding against soft-spectrum neutron flux than hard-spectrum neutron flux, and also because that the reflector consisting of graphite makes the neutron flux spectrum soft (i.e., thermalized).

Generally, when the reflector contains a high volume fraction of silicon carbide and a low volume fraction of graphite (SiC/C reflector), the neutrons are hardly moderated and hence spread afar. Contrarily, when the reflector contains a high volume fraction of graphite (C reflector, or SiC/C reflector), the neutrons are well moderated and easily thermalized. The thermalized neutrons (thermal neutrons) react well with the nuclear fuel material to easily undergo fission reaction.

In the nuclear reactor 1, the outer reflector 2 and the inner reflector 3 (or at least the inner reflector 3) contain graphite and a moderator which has a smaller moderating power than the graphite (silicon carbide, for example), and the reflectors 2 and 3 (or at least 3) are sectioned into plural parts in the direction of the flow path R of the fuel pebbles 4. Further, the volume ratio of the graphite to the moderator having a smaller moderating power than the graphite in each part of the reflectors 2 and 3 is determined based on a power distribution in the reactor core in the direction of the flow path R of the fuel pebbles 4 (see FIG. 2). For example, the inner reflector 3 is sectioned into an upper part 31, a central part 32, and a lower part 33 in the direction of flow path R of the fuel pebbles 4, and the volume ratio of the graphite to the moderator having a smaller moderating power than the graphite in each of the parts 31 to 33 is determined based on the power distribution in the reactor core (see FIGS. 6 to 9).

According to the above described arrangement, the volume fractions of elements in the reflectors 2 and 3 (in particular, the volume fraction of the moderator having a smaller moderating power than the graphite) are determined based on the power distribution in the reactor core, so that a degree of moderation of the neutrons at each position in the flow path R of the fuel pebbles 4 is adjusted. For example, at a position where the volume fraction of the moderator having a smaller moderating power than the graphite is set high, the degree of moderation of the neutrons is low, whereby the power density is suppressed. Contrarily, at a position where the volume fraction of the moderator having a smaller moderating power than the graphite is set low, the degree of moderation of the neutrons is high, whereby the power density is enhanced. Thus, the arrangement as described above is advantageous in that the power distribution in the reactor core can be adjusted, and that the power distribution in the reactor core can be equalized.

Further, when the power distribution in the reactor core is equalized, the number of replacements (the number of reloads and removals) of the fuel pebbles 4, performed for equalizing the composition of the reactor core in the axial direction, can be reduced. Thus, the above described arrangement is advantageous in that the operational costs accompanying the replacement of the fuel pebbles 4 (costs of inspection and replenishment of the fuel pebbles 4) can be reduced. Further, the above described arrangement is advantageous in that the cost of power generation can be reduced, since the above described arrangement allows for an economical operation of the nuclear reactor 1. Still further, the above described arrangement is advantageous in that the reliability of the nuclear reactor 1 can be enhanced since the number of reloads of the fuel pebbles 4 is decreased, i.e., since there is less possibility of entrainment of impurity into the fuel, which may occur at the time of reloading.

For the reflectors of the nuclear reactor 1, silicon carbide is employed as the moderator having a smaller moderating power than the graphite. The moderator, however, is not limited to silicon carbide. For example, tungsten, molybdenum, or one of carbides that have an excellent high temperature resistance other than silicon carbide may be employed as the moderator having a smaller moderating power than graphite. Similarly, low density graphite may be employed.

If the power density in the nuclear reactor which employs the reflectors 2 and 3 that contain graphite alone is set as a standard, for example, the reflectors 2 and 3 are preferably formed so that portions located in positions with high power density contain a higher volume fraction of silicon carbide (i.e., the moderator having a low moderating power than graphite) than portions located in positions with low power density. In other words, at a position where it is desirable to suppress the maximum power density of the reactor core (i.e., where the power density is high), the volume fraction of silicon carbide in each of the reflectors 2 and 3 is set high (i.e., the volume fraction of graphite is set low). Contrarily, the volume fraction of graphite in each of the reflectors 2 and 3 is set high (i.e., the volume fraction of silicon carbide is set low, or to zero) at positions where it is desirable to increase the power density (i.e., where the power density is low). Then, the neutron spectrum (distribution of neutron energy) shifts towards a high side of energy. Then, the nuclear reaction becomes difficult to occur, whereby the output of the portion decreases. Thus, the power distribution in the reactor core can be adjusted, and the power distribution in the reactor core in the direction of flow of the fuel pebbles 4 can be effectively equalized. Further, in the pebble bed reactor 1, new fuel pebbles 4 are loaded from the upper side of the reactor core. Therefore, the power density tends to be higher at the upstream side of the flow path R than at the downstream side of the flow path R. Hence, in the reflectors 2 and 3, it is preferable to set the volume fraction of silicon carbide higher in portions located at the upstream side of the flow path R than in portions located at the downstream side of the flow path R. With such arrangement, the degree of moderation of neutrons at the upstream side of the flow path R is decreased, to suppress the maximum power density of the reactor core. Then, the power density is increased at the downstream side of the flow path R owing to the suppressed amount at the upstream side under normal power. Thus, the nuclear reactor 1 is advantageous in that the power distribution in the reactor core in the flow direction of the fuel pebbles 4 can effectively be equalized.

First Set of Specific Examples of Reflectors

When the nuclear reactor 1 includes the reflectors 2 and 3, i.e., the outer reflector 2 and the inner reflector 3 as described above (see FIGS. 1 and 2), it is preferable that the volume fraction of the moderator (silicon carbide) having a smaller moderating power than the graphite be set equal to or higher than 25% at least in an approximately ⅓ portion from the upstream side of the flow path R of the fuel pebbles 4 (i.e., at least in the upper part 31 of the inner reflector 3; i.e., approximately ⅓) (see FIGS. 6 and 7). When the reflectors have such composition, the degree of moderation of neutrons is decreased at the upstream side of the flow path R, to suppress the maximum power density. Then, the power density increases at the downstream side of the flow path R owing to a suppressed amount at the upstream side. Thus, the nuclear reactor 1 is advantageous in that the power distribution in the reactor core in the flow direction of the fuel pebbles 4 is effectively equalized.

Further, it is preferable in the nuclear reactor 1 that the volume fraction of the moderator having a smaller moderating power than the graphite be set equal to or higher than 25% in the inner reflector 3 in a portion within the range of approximately ⅔ from the upstream side of the flow path R of the fuel pebbles 4 (i.e., the upper part 31 and the central part 32 of the inner reflector 3) (see FIGS. 6 and 7). Such composition is advantageous in comparison with the above described composition in that the power distribution in the reactor core in the direction of flow of the fuel pebbles 4 is more effectively equalized. In the first embodiment, the composition of the reflectors 2 and 3 is defined in terms of volume.

In the conventional nuclear reactor with the reflectors having the compositions shown in FIG. 6 and the reactor core having the power distribution shown in FIG. 7, both the inner reflector and the outer reflector consist only of graphite.

On the other hand, in an example 1 of the nuclear reactor 1, the inner reflector 3 is trisected into the upper part 31, the central part 32, and the lower part 33 from the upstream side of the flow path R in this order. The volume ratio of the silicon carbide (moderator having a smaller moderating power than graphite) to the graphite in the upper part 31 and the central part 32 in the inner reflector 3 is set to 25:75. The lower part 33 of the inner reflector 3 and the outer reflector 2 consist of graphite.

In an example 2 of the nuclear reactor 1, the volume ratio of the silicon carbide to the graphite in the upper part 31 and the central part 32 in the inner reflector 3 is set to 50:50. The lower part 33 of the inner reflector 3 and the outer reflector 2 consist of graphite.

In an example 3 of the nuclear reactor 1, the volume ratio of the silicon carbide to the graphite in the upper part 31 and the central part 32 in the inner reflector 3 is set to 75:25. The lower part 33 of the inner reflector 3 and the outer reflector 2 consist of graphite.

In an example 4 of the nuclear reactor 1, the upper part 31 and the central part 32 of the inner reflector 3 consist of silicon carbide. The lower part 33 of the inner reflector 3 and the outer reflector 2 consist of graphite.

As shown in results of calculations in FIG. 7, in the nuclear reactors of the examples 1 to 4, the power density at the upstream side of the flow path R is suppressed in comparison with the conventional nuclear reactor, while the power density at the downstream side of the flow path R is increased by the suppressed amount. For example, when the conventional example is compared with the example 4, the maximum power density of the example 4 is suppressed to approximately ⅓ of the maximum power density of the conventional example. The results of calculations in FIG. 7 show relation between the positions in the axial direction in the reactor core and the maximum power density near a position radially inside the reactor core.

Second Set of Specific Examples of Reflectors

Further, in the nuclear reactor 1, it is preferable that the volume fraction of the moderator having a smaller moderating power than graphite in each of the inner reflector 3 and the outer reflector 2 be set equal to or higher than 25% in a ⅓ portion from the upstream side of the flow path R of the fuel pebbles 4 (see FIGS. 8 and 9). With such a composition, the degree of moderation of neutrons decreases at the upstream side of the flow path R to suppress the power density near the upstream side. In addition, since the degree of moderation of neutrons is adjusted by both the inner reflector 3 and the outer reflector 2, the power density can effectively be suppressed. The output at the downstream side of the flow path R is, then, increased owing to the suppressed amount at the upstream side under normal power. Thus, the above described composition is advantageous in that the power distribution in the reactor core in the flow direction of the fuel pebbles 4 can effectively be equalized.

Further, in the nuclear reactor 1, it is preferable that the volume fraction of the moderator having a smaller moderating power than graphite in the inner reflector 3 be set equal to or higher than 25% in an approximately ⅔ portion from the upstream side of the flow path R of the fuel pebbles 4 (see FIGS. 8 and 9). The composition is advantageous in comparison with the above described composition in that the power distribution in the reactor core in the flow direction of the fuel pebbles 4 can more effectively be equalized.

In the nuclear reactor 1, the criticality is adjusted through the adjustment of enrichment (uranium enrichment) of the fuel pebbles 4.

For example, in an example 5 of the nuclear reactor 1 having the reflectors with the composition as shown in FIG. 8 and the power distribution as shown in FIG. 9, the inner reflector 3 is trisected into the upper part 31, the central part 32, and the lower part 33 from the upstream side of the flow path R in this order. The outer reflector 2 is also trisected into the upper part 21, the central part 22, and the lower part 23, in this order from the upstream side of the flow path R. The volume ratio of the silicon carbide (moderator having a smaller moderating power than the graphite) to the graphite in each of the upper part 31 of the inner reflector 3 and the upper part 21 of the outer reflector 2 is set to 75:25. The central part 32 and the lower part 33 of the inner reflector 3 and the central part 22 and the lower part 23 of the outer reflector 2 consist of graphite.

In an example 6 of the nuclear reactor 1, the upper part 31 of the inner reflector 3 consists of the moderator having a smaller moderating power than graphite. Further, the volume ratio of the silicon carbide to the graphite in the upper part 21 of the outer reflector 2 is set to 75:25. Further, the central part 32 and the lower part 33 of the inner reflector 3 and the central part 22 and the lower part 23 of the outer reflector 2 consist of graphite.

In an example 7 of the nuclear reactor 1, the volume ratio of the silicon carbide to the graphite in each of the upper part 31 of the inner reflector 3 and the upper part 21 of the outer reflector 2 is set to 75:25. Further, the volume ratio of the silicon carbide to the graphite in the central part 32 of the inner reflector 3 is set to 25:75. Further, the lower part 33 of the inner reflector 3 and the central part 22 and the lower part 23 of the outer reflector 2 consist of graphite.

In an example 8 of the nuclear reactor 1 which has the same composition as the example 7 of the nuclear reactor 1, the criticality is maintained through the adjustment of uranium enrichment in the fuel pebbles 4.

As shown in the results of calculations of FIG. 9, the power density at the upstream side of the flow path R is suppressed while the power density at the downstream side of the flow path R is increased owing to the suppressed amount at the upstream side under normal power in the nuclear reactors of examples 5 to 8 in comparison with the conventional nuclear reactor. For example, the maximum power density of the example 9 is suppressed to a level equal to or lower than approximately ⅓ the maximum power density of the conventional nuclear reactor. The power distribution shown in FIG. 9 illustrates relation between the position in the axial direction of the reactor core and the maximum power density near a position radially inside the reactor core.

Second Embodiment

Figure 10:
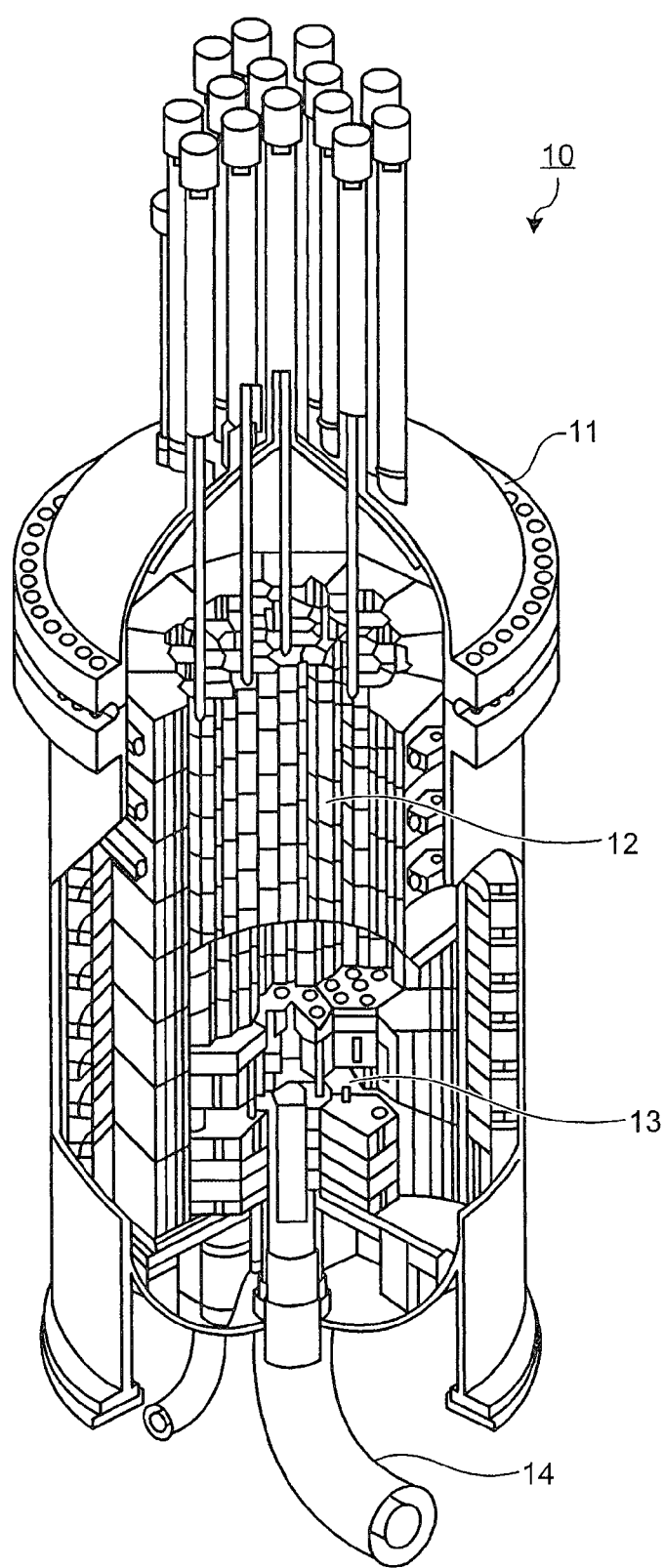
FIG. 10 is a perspective view of a nuclear reactor according to the second embodiment of the present invention.
Figure 12:
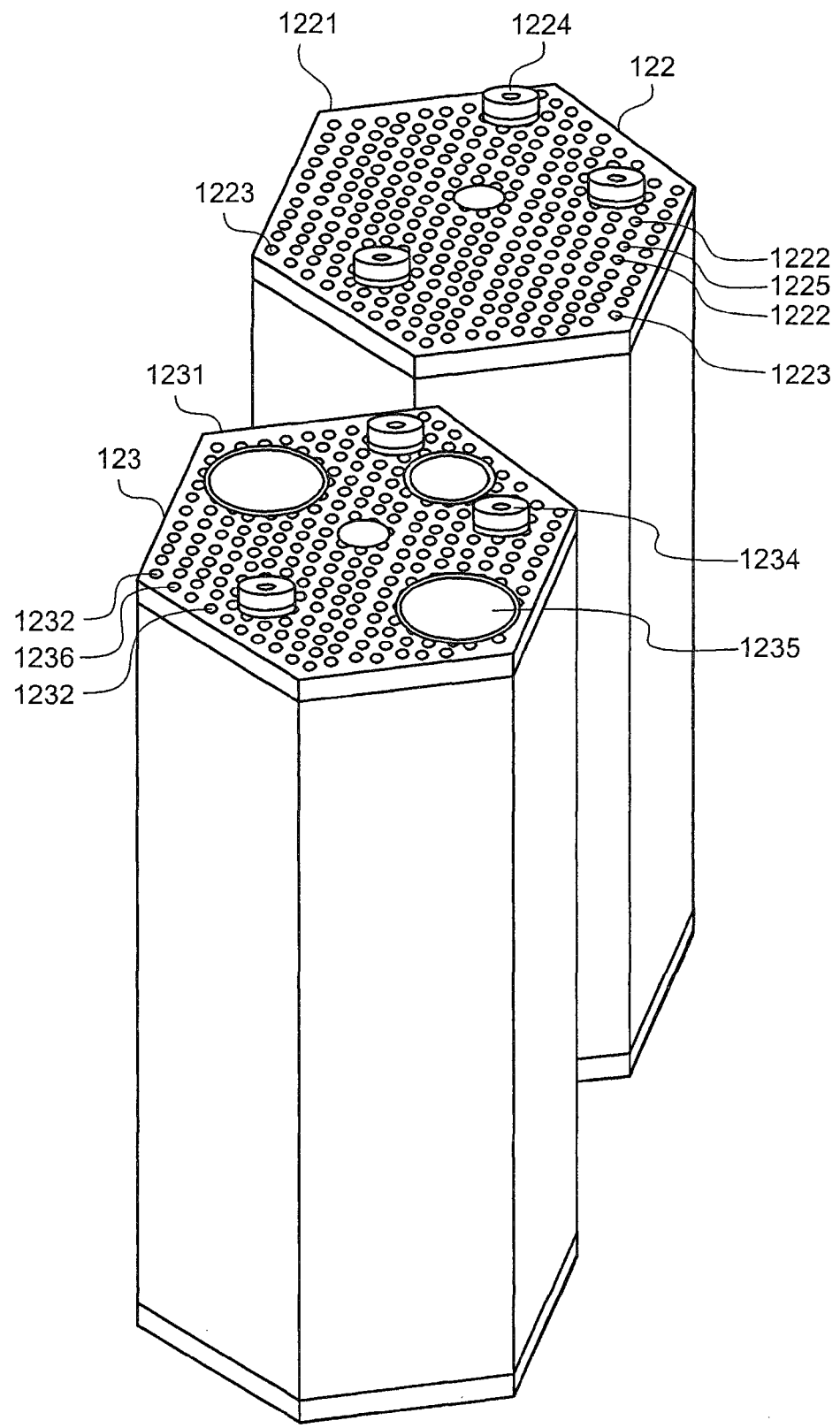
FIG. 12 is a perspective view of a block-type fuel block (multi-hole-type fuel body) employed in the nuclear reactor shown in FIG. 10.
Figure 13:
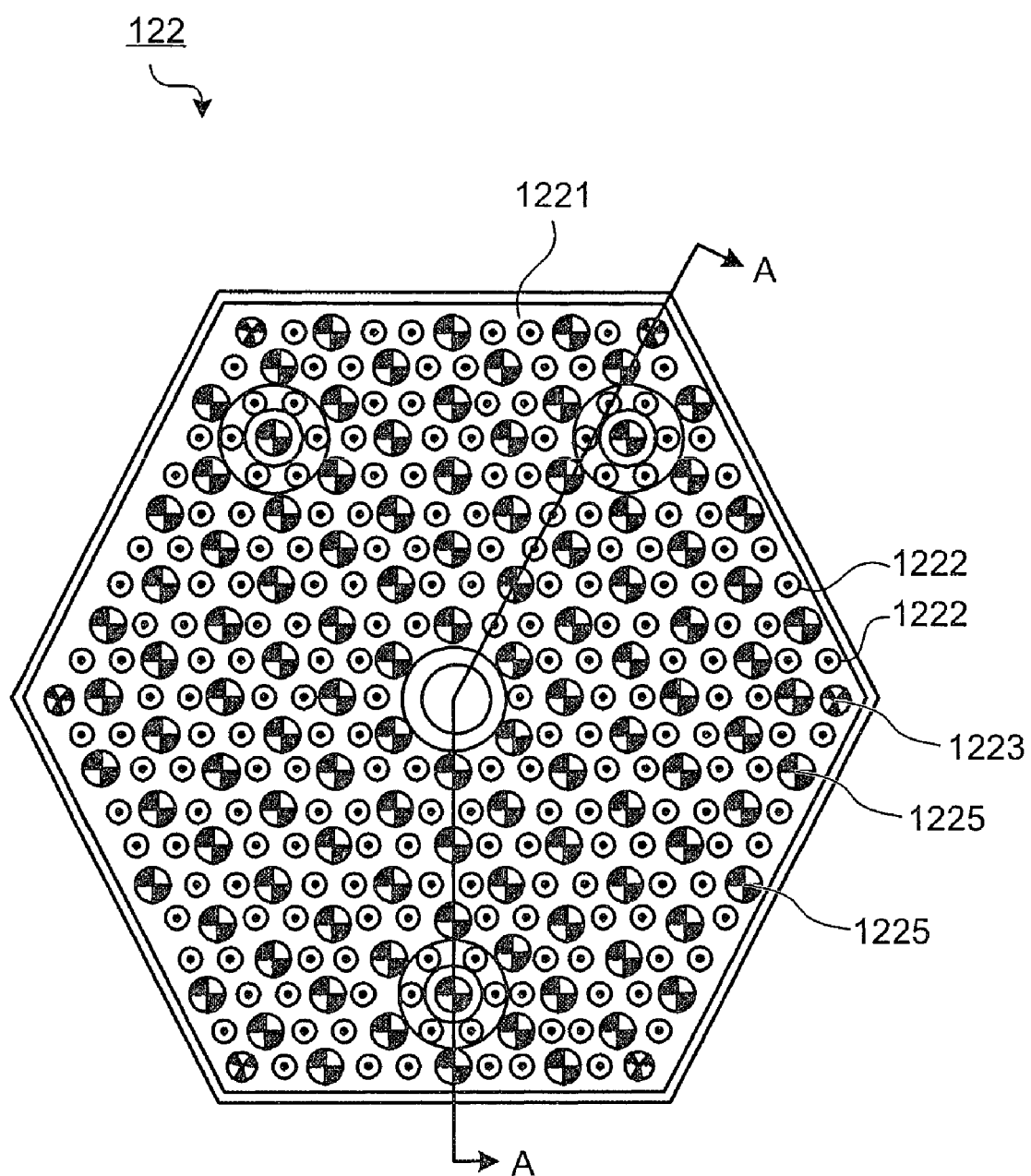
FIG. 13 is a plan view of the block-type fuel block (multi-hole-type fuel body) employed in the nuclear reactor shown in FIG. 10.
Figure 14:
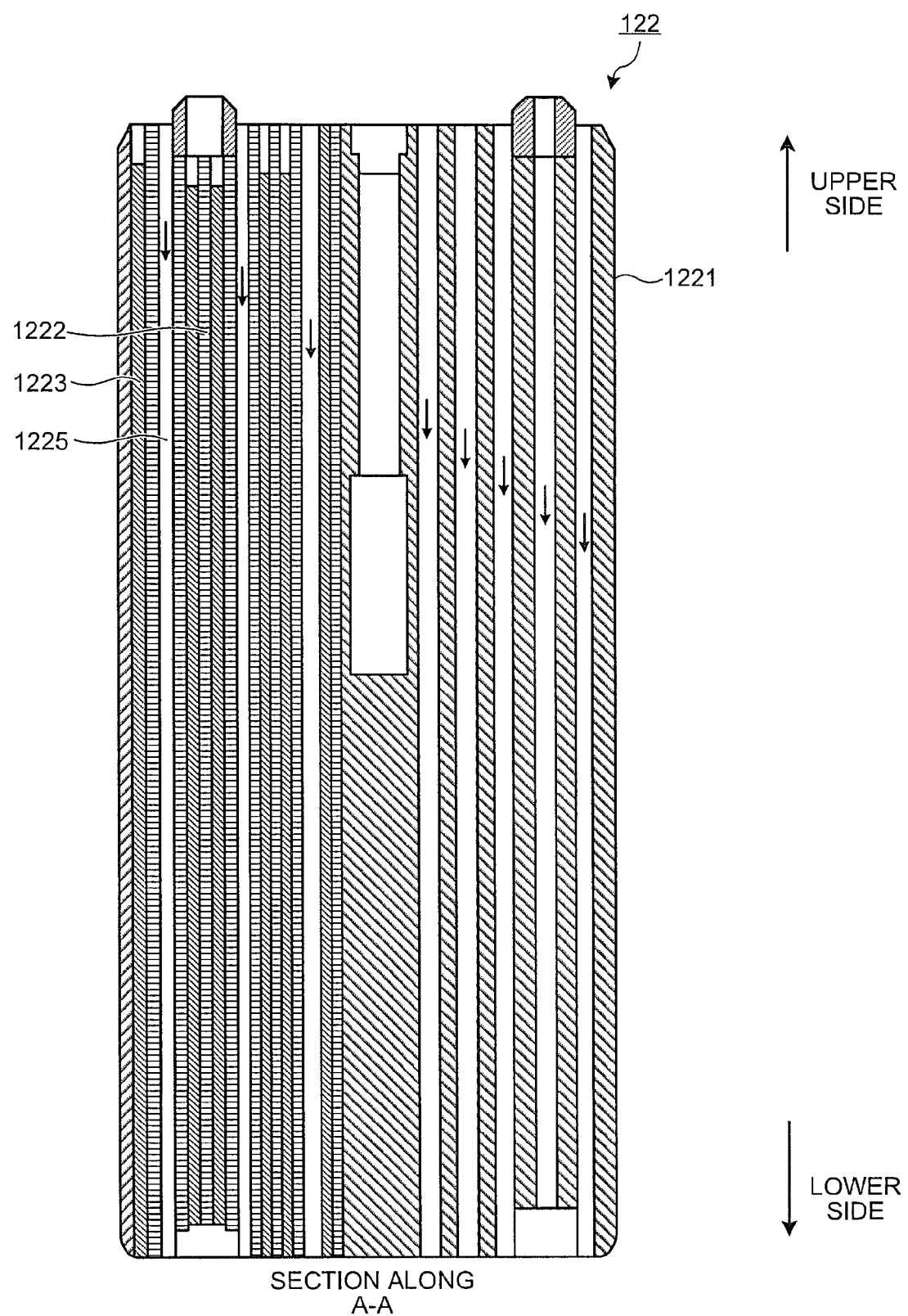
FIG. 14 is a sectional view of the block-type fuel block (multi-hole-type fuel body) employed in the nuclear reactor shown in FIG. 10 along a line A-A of FIG. 13.
Figure 15:
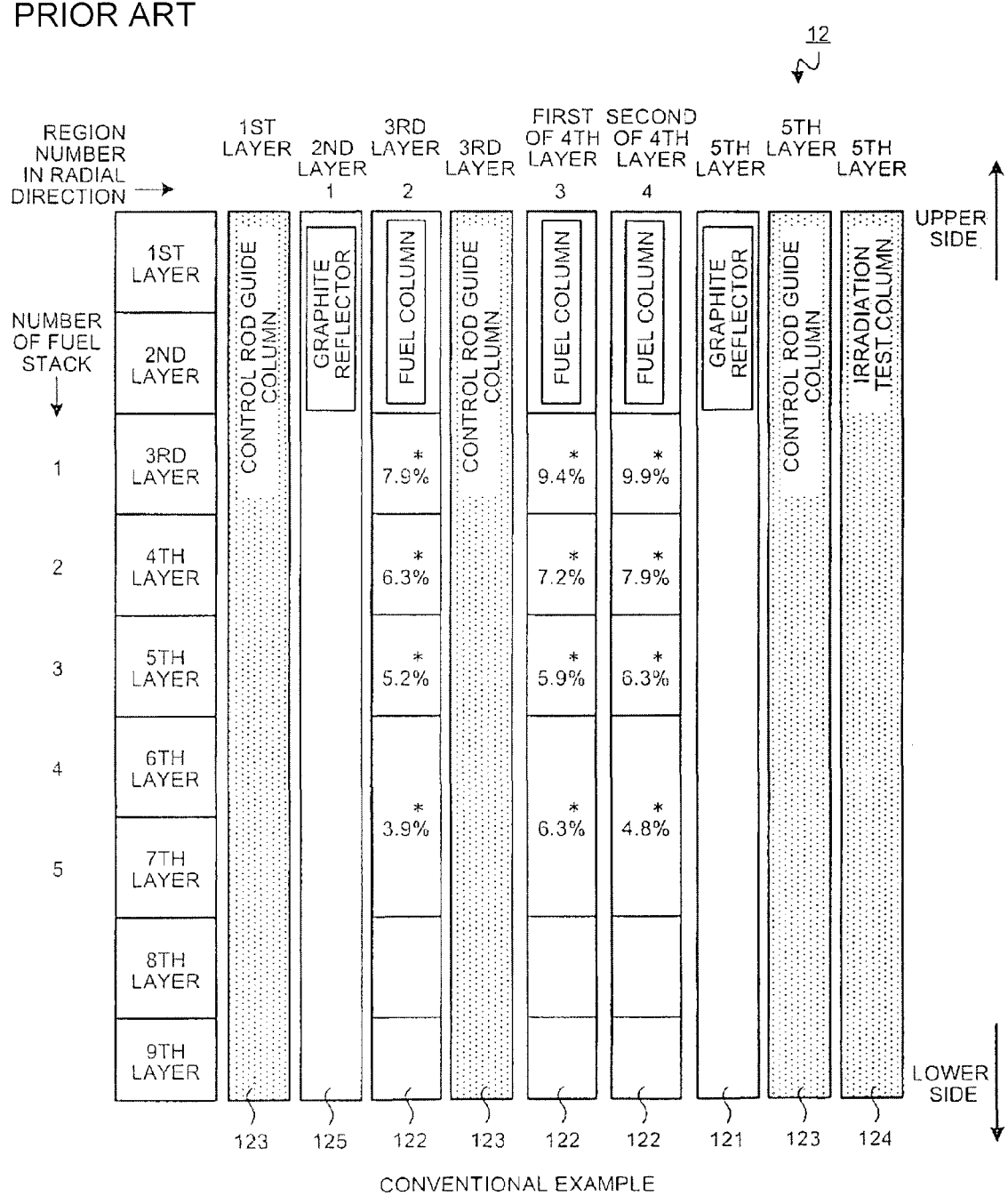
FIG. 15 schematically shows a reactor core of a conventional nuclear reactor.
Figure 16:
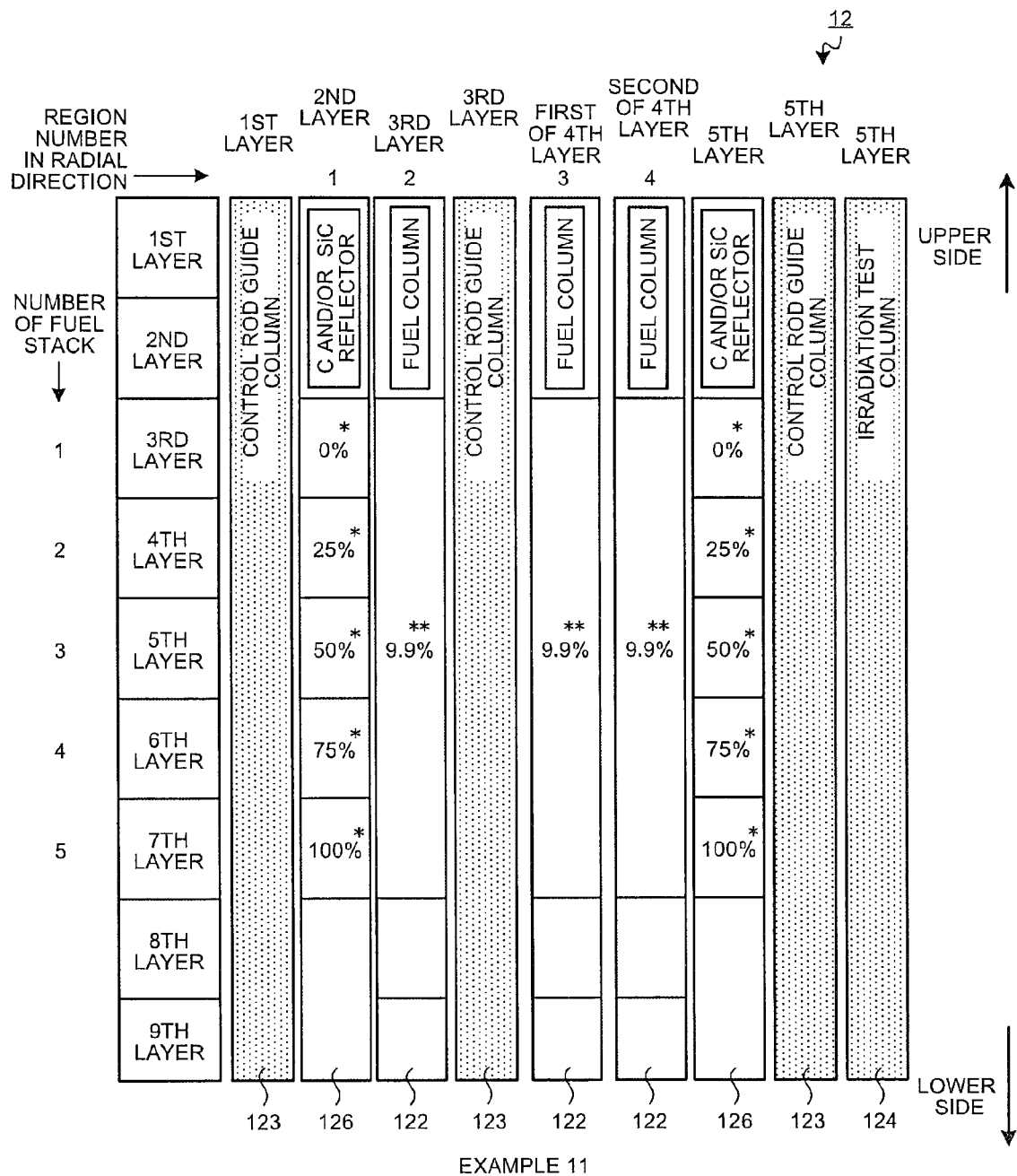
FIG. 16 schematically shows a specific example of the reactor core of the nuclear reactor shown in FIG. 10.
Figure 17:
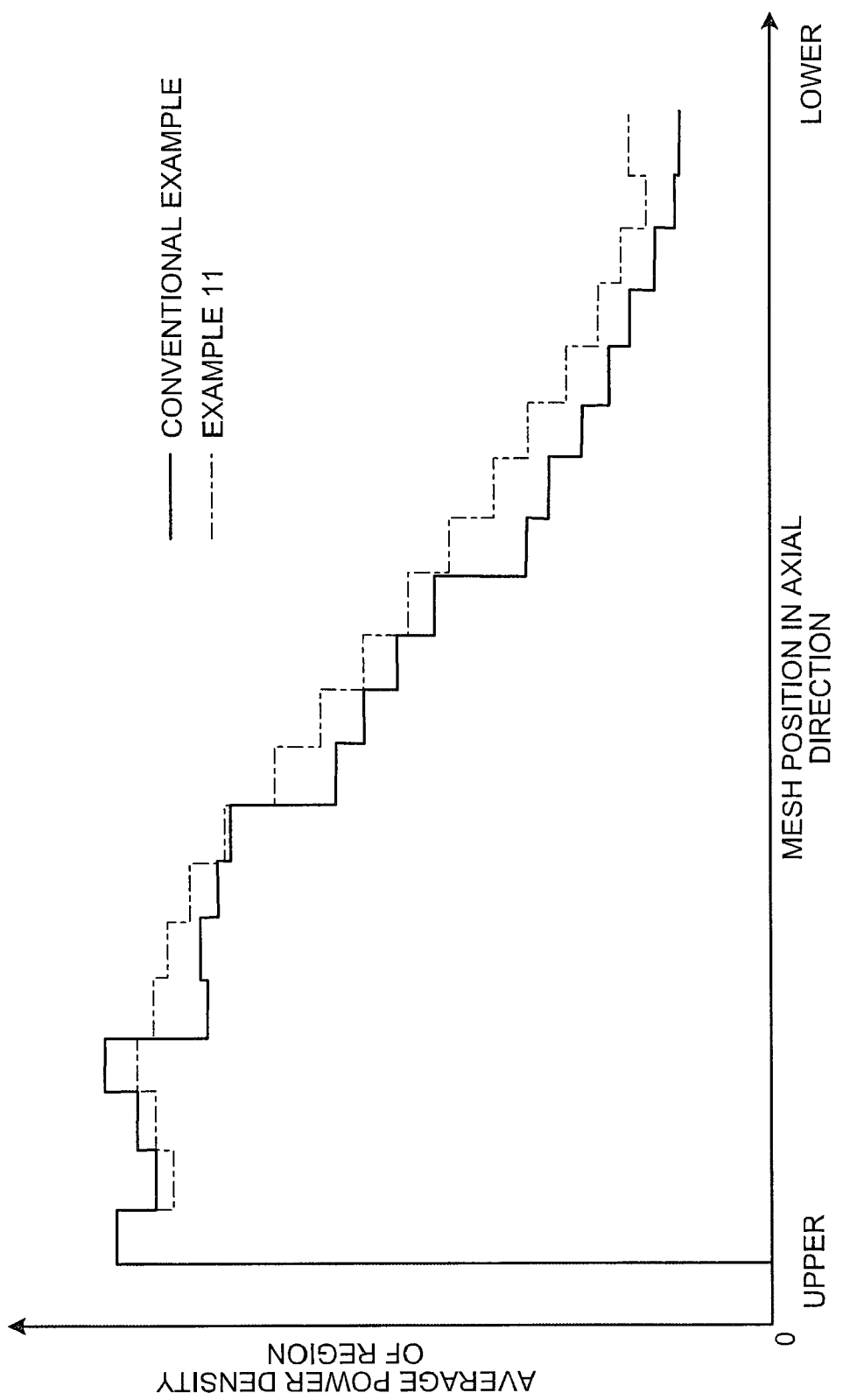
FIG. 17 is a graph of power distribution in the nuclear reactor shown in FIG. 16.

FIG. 10 shows a schematic structure of a nuclear reactor according to the second embodiment of the present invention. FIG. 11 is an explanatory view of a reactor core of the nuclear reactor shown in FIG. 10. FIGS. 12 to 14 are a perspective view (FIG. 12), a plan view (FIG. 13), and a sectional view along line A-A of FIG. 13 (FIG. 14) of a fuel block (fuel body) employed in the nuclear reactor of FIG. 10, respectively. FIG. 15 shows a schematic structure of the reactor core of the conventional nuclear reactor. FIG. 16 shows a schematic structure of a specific example of a reactor core of the nuclear reactor shown in FIG. 10. FIG. 17 is a graph showing results of power distribution of the nuclear reactor shown in FIG. 16.

Block-Type High Temperature Gas Reactor

A nuclear reactor 10 is, for example, applied to a block-type high temperature gas reactor (see FIG. 10). The nuclear reactor 10 includes a steel nuclear reactor vessel 11, a reactor core 12, reactor internals 13 that support the reactor core 12, and a piping 14 for a cooling system. Coolant flows through the piping 14. In the nuclear reactor 10, the reactor core 12 and the reactor internals 13 are housed inside the nuclear reactor vessel 11. Helium gas is employed as the coolant, for example.

The reactor core 12 includes outer reflectors 121, fuel blocks (fuel bodies) 122, control rod guide columns 123, irradiation test columns 124, inner reflectors (graphite reflector columns) 125, and the like (see FIGS. 11 and 12). The outer reflector 121 is made of graphite in a block-shape. Graphite blocks are arranged in a circle to form an outer peripheral portion of the reactor core 12. The fuel block 122, the control rod guide column 123, the irradiation test column 124, and the inner reflector 125 are each hexagonal column-shaped, and arranged inside the outer reflector 121 with their longitudinal directions (axial directions) in line with the axial direction of the reactor core 12. In the nuclear reactor 10, the reactor core 12 is sectioned into four regions in the radial direction, and the fuel loading is performed independently for each region (see FIG. 11). Thus, the distribution of fuel temperature is optimized, and the maximum fuel temperature is minimized.

The fuel block 122 includes a hexagonal columnar graphite block 1221, fuel rods 1222 that are inserted into the graphite block 1221 and held thereby, burnable poison rods 1223, and coolant flow paths 1225 (see FIG. 13). Further, the fuel block 122 is formed with a cylindrical graphite sleeve and a fuel compact sealed therein. The fuel compact has a cylindrical shape. In the fuel compact, plural coated fuel particles are dispersed in a graphite base material (graphite substrate). Further, the coated fuel particle includes a fuel kernel of uranium dioxide ($UO_2$) and three thin layers of pyrolytic carbon (PyC) or silicon carbide (SiC) formed on the fuel kernel.

In the fuel block 122, plural coolant flow paths 1225 run in the longitudinal direction of the fuel block 122 (see FIG. 14). Through the coolant flow path 1225, the coolant (helium gas) flows from the upper side of the reactor core 12 to the lower side of the reactor core 12. FIG. 14 shows the flow direction of the coolant by an arrow. After cooling the fuel block 122, the coolant flows through the piping 14 and is recovered outside the nuclear reactor 11 (see FIG. 10).

Conventional Block-Type Reactor Core

Generally, in the block-type high temperature gas reactor, it is preferable for safety, for example, that the power distribution (depended on distribution of neutron flux) in the axial direction in the reactor core be optimized to reduce the maximum fuel temperature. In the conventional nuclear reactor, fuel is employed at various degrees of uranium enrichment in the reactor core (in the example described herein, fuel is employed at twelve different degrees of uranium enrichment) for the optimization of the power distribution in the axial direction (see FIG. 15).

In such an arrangement, the enrichment of the nuclear fuel in each portion of the reactor core 12 is determined based on the power distribution in the reactor core, whereby the nuclear reaction of the nuclear fuel material in the fuel blocks 122 at each position of the reactor core 12 is adjusted. For example, at a position where the enrichment of the nuclear fuel is set high, the nuclear reaction is accelerated to enhance the power density. Contrarily, at a position where the enrichment of the nuclear fuel is set low, the nuclear reaction is decelerated to suppress the power density. Thus, the output of the reactor core 12 can be adjusted. Such an arrangement is advantageous in that the power distribution in the reactor core 12 can be optimized.

Specifically, the enrichment of the nuclear fuel in each portion of the reactor core 12 is determined so that the enrichment lowers from the upstream side of the coolant flow path 1225 towards the downstream side thereof (i.e., from the upper side to the lower side of the reactor core 12) (see FIG. 15). In other words, the enrichment of the nuclear fuel is set high at the upstream side of the reactor core 12 (upper side of the reactor core 12) to enhance the power density, whereas the enrichment of the nuclear fuel is set low at the downstream side of the reactor core 12 (lower side of the reactor core 12) to suppress the power density. Thus, the power distribution in the reactor core in the flow direction of the coolant is effectively optimized and the maximum fuel temperature is suppressed to a low level. In FIG. 15, numerical values shown inside the portions of fuel blocks 122 indicate the enrichment of the nuclear fuel.

In the above structure, it is preferable that the inner reflector (graphite reflector column) 125 that reflects the neutrons be arranged closer to the center of the reactor core 12 in the radial direction than the fuel blocks 122 in the reactor core 12 (see FIG. 15). In such structure, the inner reflector 125 arranged closer to the center of the reactor core 12 in the radial direction reflects and moderates the neutrons. Thus, the structure is advantageous in that the neutrons are effectively moderated, and that the maximum fuel temperature which is reached at the center of the reactor core at the depressurization accident, for example, can be suppressed to a low level. In FIG. 15, numerical values shown inside the portions of fuel blocks 122 indicate the uranium enrichment of the nuclear fuel.

For example, in the example shown in FIGS. 15 and 16, in the conventional nuclear reactor, the enrichment of the nuclear fuel in each portion of the reactor core 12 is set so that the enrichment decreases from the upstream side toward the downstream side of the reactor core 12 (i.e., from the upper side toward the lower side of the reactor core 12). At the same time, the inner reflector 125 is arranged inside the reactor core 12 closer to the center of the reactor core 12 in the radial direction than the fuel blocks 122.

Specific Example of Reactor Core

In the nuclear reactor 10, it is preferable that the reflector 126 which contains graphite and moderator that has a smaller moderating power than the graphite (for example, silicon carbide) be arranged inside the reactor core 12; that the reflector 126 is sectioned into plural parts along the flow direction of the coolant; and that the volume ratio of the graphite to the moderator having a smaller moderating power than the graphite in each part of the reflector 126 is determined based on the power distribution in the reactor core 12 in the flow direction of the coolant (see FIG. 16).

In such structure, since the volume ratio of the graphite to the silicon carbide (moderator having a smaller moderating power than the graphite) in each portion of the reflector 126 is determined based on the power distribution in the reactor core, the power density at each position in the reactor core 12 is adjusted. For example, at a position where the volume fraction of the silicon carbide is set high, the degree of moderation of neutrons becomes low, whereby the power density is suppressed. Contrarily, at a position where the volume fraction of silicon carbide is set low, the moderation of neutrons is accelerated to enhance the power density. Thus, the structure is advantageous in that the power distribution in the reactor core 12 can be adjusted, and that the power distribution in the reactor core 12 can be optimized.

Further, it is preferable that the volume ratio of the graphite to the moderator having a smaller moderating power than the graphite in respective portions of the reflector 126 in the nuclear reactor 10 be determined so that the volume ratio increases from the upstream side toward the downstream side of the reactor core 12 (from the upper side toward the lower side of the reactor core 12) (see FIG. 16). In other words, the volume fraction of the graphite is set high at the upstream side of the reactor core 12 (upper side of the reactor core 12) to enhance the output of the reactor core 12. Contrarily, the volume fraction of the moderator having a smaller moderating power than the graphite is set high at the downstream side of the reactor core 12 (lower side of the reactor core 12) to suppress the power density. Thus, the structure is advantageous in that the power distribution in the reactor core 12 can be adjusted, and that the power distribution in the reactor core 12 in the flow direction of the coolant can effectively be optimized.

For example, the inner reflector 126 in an example 11 shown in FIG. 16 is sectioned into five parts along the flow direction of the coolant (axial direction of the reactor core 12), so that the volume fraction of silicon carbide increases by 25% in each part from the upper side toward the lower side of the reactor core 12. The reflector 126 is arranged in the second layer and the fifth layer from the center of the reactor core 12 in the radial direction. Thus, the plural reflectors 126 are arranged so as to sandwich the fuel blocks 122 from the inner side and the outer side in the radial direction of the reactor core 12, and so as to be located near the fuel blocks 122.

The numerical values shown in the fuel blocks 122 in FIG. 16 indicate the enrichment of the nuclear fuel, whereas the numerical values in the inner reflectors 126 indicate the volume fraction of the moderator (silicon carbide) having a smaller moderating power than the graphite. For example, if the numerical value in the reflector 126 is 25%, it means that the volume ratio of the moderator having a smaller moderating power than the graphite to the graphite is 25:75. In the second embodiment, the composition of the inner reflector 126 is defined by volume.

As shown by the results of calculations shown in FIG. 17, it can be seen that the power distribution in the reactor core 12 in the flow direction of the coolant in the nuclear reactor 10 of the example 11 is further optimized in comparison with the power distribution in the conventional example.

As can be seen from the foregoing, in the nuclear reactor (pebble bed reactor) according to one aspect of the present invention, composition of the reflector (in particular, the volume fraction of the moderator which has a smaller moderating power than graphite) is determined based on the power distribution in the reactor core. A degree of moderation of neutrons at each position in the flow path of the fuel pebbles is adjusted, accordingly. Thus, the nuclear reactor according to one aspect of the present invention is advantageous in that the power distribution in the reactor core can be adjusted, and that the power distribution in the reactor core can be equalized accordingly.

In the nuclear reactor (pebble bed reactor) of another aspect of the present invention, the volume fraction of the moderator, which has a smaller moderating power than the graphite, in a portion of the reflector is set high, when the portion is located in a region with high power density. Therefore, the neutron spectrum (neutron energy distribution) shifts towards a side of a higher energy level, to suppress the nuclear reaction, whereby the power density of the portion is decreased. Thus, the nuclear reactor according to another aspect of the present invention is advantageous in that the power distribution in the reactor core is effectively equalized in the flow direction of the fuel pebbles.

In the nuclear reactor (pebble bed reactor) according to still another aspect of the present invention, the degree of moderation of neutrons is decreased at the upstream side of the flow path to suppress the power density. Under a condition set to keep the total power of the reactor core constant, the power density at a downstream side of the flow path increases owing to the suppressed amount of output at the upstream side. Thus, the nuclear reactor according to the still another aspect of the present invention is advantageous in that the power distribution in the reactor core is effectively equalized in the flow direction of the fuel pebbles.

In the nuclear reactor (pebble bed reactor) according to still another aspect of the present invention, the degree of moderation of neutrons at the upstream side of the flow path is decreased to suppress the power density. Under the condition set to keep the total power of the reactor core constant, the power density at the downstream side of the flow path is increased owing to the suppressed amount of output at the upstream side. Thus, the nuclear reactor according to the still another aspect of the present invention is advantageous in that the power distribution in the reactor core is effectively equalized in the flow direction of the fuel pebbles.

The nuclear reactor (pebble bed reactor) according to the still another aspect of the present invention is advantageous in comparison with the nuclear reactor according to the other aspects in that the power distribution in the reactor core is more effectively equalized in the flow direction of the fuel pebbles.

In the nuclear reactor (pebble bed reactor) according to still another aspect of the present invention, the degree of moderation of neutrons is decreased at the upstream side of the flow path, to suppress the power density. Further, since the neutrons are moderated by both the inner reflector and the outer reflector, the power density is effectively suppressed. Under the condition set to keep the total power of the reactor core constant, the output is increased at the downstream side of the flow path owing to the suppressed amount of output at the upstream side of the flow path. Thus, the nuclear reactor according to the still another aspect of the present invention is advantageous in that the power distribution in the reactor core is effectively equalized in the flow direction of the fuel pebbles.

The nuclear reactor (pebble bed reactor) according to the still another aspect of the present invention is advantageous in comparison with the nuclear reactor according to the other aspects in that the power distribution in the reactor core is more effectively equalized in the flow direction of the fuel pebbles.

In the nuclear reactor (pebble bed reactor) according to still another aspect of the present invention, since the criticality of the reactor core is adjusted by the enrichment of the fuel pebble, the output can be maintained.

In the nuclear reactor (block reactor) according to still another aspect of the present invention, the volume ratio of the graphite to the moderator which has a smaller moderating power than the graphite in each portion of the reflector is determined so as to optimize the power distribution in the reactor core. Therefore, the power density of the reactor core at each position in the coolant flow path is adjusted. Thus, the nuclear reactor according to the still another aspect of the present invention is advantageous in that the power distribution of the reactor core can be adjusted, and that the power distribution in the reactor core can be equalized and/or optimized accordingly.

In the nuclear reactor (block reactor) according to still another aspect of the present invention, the volume fraction of the moderator which has a smaller moderating power than graphite is set high in the downstream side of the coolant flow path (lower side of the reactor core) to suppress the maximum power density and/or the maximum fuel temperature. Thus, the nuclear reactor according to the still another aspect of the present invention is advantageous in that the power distribution in the reactor core can be adjusted and that the power distribution in the reactor core in the flow direction of the coolant can be effectively optimized so that the power density decreases towards the downstream side.

In the nuclear reactor according to the present invention, the composition of the reflector (in particular the volume fraction of the moderator that has a smaller moderating power than graphite) is determined so as to optimize the power distribution in the reactor core. Therefore, the degree of moderation of neutrons at each position in the flow path of the fuel bodies is adjusted. Thus, the nuclear reactor according to the present invention is advantageous in that the power distribution in the reactor core can be adjusted, and that the power distribution in the reactor core can be optimized accordingly.

In the nuclear reactor according to the present invention, since the volume ratio of the graphite to the moderator which has a smaller moderating power than the graphite in each portion of the reflector is determined so as to optimize the power distribution in the reactor core, the power density of the reactor core at each position in the coolant flow path is adjusted. Thus, the nuclear reactor according to the present invention is advantageous in that the power distribution in the reactor core can be adjusted, and that the power distribution of the reactor core can be equalized and/or optimized accordingly.

As can be seen from the foregoing, the nuclear reactor according to the present invention is useful in that the power distribution in the reactor core can be equalized and/or optimized without the need of repetitious reloading of the fuel pebbles (in the pebble bed reactor core) and without the need of preparation of fuel in various different uranium enrichment levels (in the block-type reactor core).

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:
1. A pebble bed nuclear reactor comprising:
a reflector reflecting neutrons and containing graphite and moderator having a smaller moderating power than the graphite, the reflector being sectioned into plural parts along a direction of flow of fuel pebbles; and
a flow path surrounded by the reflector, and through the flow path the fuel pebbles flow and undergo nuclear reaction to generate power, wherein
a volume ratio of the graphite to the moderator having a smaller moderating power than the graphite in each part of the reflector is determined based on a power distribution of a reactor core in the direction of flow of the fuel pebbles,
the reflector includes an inner reflector and an outer reflector that surrounds a reactor core, the flow path of the fuel pebbles is surrounded by an outer circumference of the inner reflector and an inner circumference of the outer reflector, the volume fraction of the moderator having a smaller moderating power than the graphite is set equal to 75% in an approximately ⅓ portion of the inner reflector from an upstream side of the flow path of the fuel pebbles, to 25% in an approximately ⅓ portion at the center of the inner reflector, and to 75% in an approximately ⅓ portion of the outer reflector from the upstream side, and the other portions are made of graphite.

2. The pebble bed nuclear reactor according to claim 1, wherein criticality of the reactor core is adjusted by enrichment of the fuel pebbles.

* * * * *